US006776486B2

(12) United States Patent
Steele et al.

(10) Patent No.: US 6,776,486 B2
(45) Date of Patent: Aug. 17, 2004

(54) PROGRESSIVE ADDITION POWER LENS

(75) Inventors: Trevor Steele, Dromara (GB); Hugh McLoughlin, Randalstown (GB); Derek Payne, Bristol (GB)

(73) Assignee: Crossbows Optical Limited, Graigavon (GB)

( * ) Notice: Subject to any disclaimer, the term of this patent is extended or adjusted under 35 U.S.C. 154(b) by 0 days.

(21) Appl. No.: 10/214,553

(22) Filed: Aug. 9, 2002

(65) Prior Publication Data

US 2003/0223033 A1 Dec. 4, 2003

(30) Foreign Application Priority Data

May 31, 2002 (GB) ................................ PCT/GB02/02284

(51) Int. Cl.⁷ ................................................. G02C 7/06
(52) U.S. Cl. ....................................... 351/169; 351/177
(58) Field of Search ................................. 351/169, 177, 351/178

(56) References Cited

U.S. PATENT DOCUMENTS

| | | | |
|---|---|---|---|
| 3,687,528 A | | 8/1972 | Maitenaz |
| 4,240,719 A | * | 12/1980 | Guilino et al. ............... 351/169 |
| 4,315,673 A | | 2/1982 | Guilino et al. |
| 4,514,061 A | | 4/1985 | Winthrop |
| 4,606,622 A | | 8/1986 | Fueter |
| 4,838,675 A | | 6/1989 | Barkan et al. |
| 4,861,153 A | | 8/1989 | Winthrop |
| 5,123,725 A | * | 6/1992 | Winthrop .................... 351/169 |
| 5,886,766 A | | 3/1999 | Kaga et al. |
| 6,256,098 B1 | * | 7/2001 | Rubinstein et al. ......... 356/602 |
| 6,302,540 B1 | | 10/2001 | Katzman et al. |

OTHER PUBLICATIONS

I.N. Bronshtein & K.A. Semendyayev, "A Guide Book to Mathematics," Verland Harri Deutsch 1971 pp. 308–313.
J. Loos, G. Greiner & H.P. Seidel "A variational approach to progressive lens design", in Cuputer Aided Design vol. 30, pp. 595–602 1998.
J.T. Winthrop, "The TRUVISION® Progressive Power Lens," Jul. 20, 1982.
G. Furter, "Zeiss Gradal—The progressive addition lens with maximum wearing comfort", in Zeiss Information vol. 97, pp. 55–59, 1986.
M. Tazeroualti, "Designing a progressive lens", in "Curves and Surfaces in Geometric Design", edited by P.J. Laurent et al., AK Peters, pp. 467–474, 1994.
PCT International Search Report, Aug. 7, 2003.

* cited by examiner

Primary Examiner—Georgia Epps
Assistant Examiner—Deborah Raizen
(74) Attorney, Agent, or Firm—Richard Schnurr; Jill T. Powlick; Ice Miller

(57) ABSTRACT

A system and method for designing a progressive lens. Mean power is specified at points distributed over the entire surface of the lens and lens height is specified around the edge of the lens. Lens height is determined at the points consistent with the specified mean power and the lens edge height in part by solving a partial differential equation of the elliptic type subject to the lens edge height as a boundary condition. A successive over-relaxation technique may be employed to converge on the solution to the partial differential equation, and an over-relaxation factor may be determined to most efficiently relax the equation.

32 Claims, 13 Drawing Sheets

PROGRESSIVE ADDITION POWER LENS

This application claims priority from international application number PCT/GB02/02284 filed on May 31, 2002, the contents of which are hereby incorporated by reference in their entirety. This international application will be published under PCT Article 21(2) in English.

BACKGROUND OF THE INVENTION

1. Field of the Invention

The invention relates generally to progressive addition power ophthalmic lenses and, in particular, to an improved system and method for designing such lenses.

2. Description of the Related Art

Bifocal spectacle lenses have been used for many years by people suffering from presbyopia, a medical condition that causes loss of accommodation of the eye with advancing age resulting in difficulty focusing. Bifocal lenses provided a solution by dividing the lenses horizontally into two regions, each having a different optical power. The upper region of the lens was designed with the appropriate optical power for distance viewing, while the lower region was designed for closer viewing (e.g. reading). This allows the wearer to focus at different distances by merely changing their gaze position. However, wearers frequently experienced discomfort due to the abrupt transition between the different lens regions. As a consequence, progressive addition lenses were developed to provide a smooth transition in optical power between the regions of the lens.

Conventionally, progressive addition lenses are usually described as having three zones: an upper zone for far vision, a lower zone for near vision, and an intermediate progression corridor that bridges the first two zones. FIG. 1 is a diagram of a typical progressive lens shown in vertical elevation (plan view). The lens has an distance zone 2 with a given, relatively lower mean power and a reading zone 4 with relatively higher mean power. An intermediate progression corridor 6 of varying and usually increasing mean power connects the distance and reading zones. The outlying regions 8 adjoining the progression corridor and the lens boundary 10 (i.e. the edge of the lens) are also shown.

The goals in designing progressive lenses have been to provide both essentially clear vision in upper and lower zones 2 and 4 and smooth variation in optical power through the progression corridor 6, while at the same time to control the distribution of astigmatism and other optical aberrations.

Early design techniques required the lens to be spherical throughout the distance and reading zones, and employed various interpolative methods to determine the lens shape in the progression corridor and outlying regions. These techniques suffered from several disadvantages. Although the optical properties of the distance zone, reading zone, and progression corridor were usually satisfactory, regions adjoining the progression corridor and lens edge tended to have significant astigmatism. Interpolative methods designed to compress astigmatism into regions near the progression corridor yielded relatively steep gradients in mean power, astigmatism and prism. The resulting visual field was not as smooth and continuous as would be desirable for comfort, ease of focusing, and maximizing the effective usable area of the lens.

FIG. 2 shows a three dimensional representation of the mean power distribution over the surface of a typical progressive lens design. Mean power M is graphed in the vertical direction and the disc of the lens in shown against x and y coordinates. The disc of the lens is viewed from an angle less than 90° above the plane of the lens. The orientation of the lens is opposite of that in FIG. 1, the distance area with low mean power 12 shown in the foreground of FIG. 2 and the reading area with high mean power 14 shown at the back. Steep gradients in mean power are evident, especially in the outlying regions 16.

Many progressive lens design systems permit the designer to set optical properties at only a few isolated points, curves, or zones of the lens and employ a variety of interpolative methods to determine the shape and optical properties of the remainder of the lens.

U.S. Pat. No. 3,687,528 to Maitenaz, for example, describes a technique in which the designer specifies the shape and optical properties of a base curve running from the upper part of the lens to its lower part. The base curve, or "meridian line" is the intersection of the lens surface with the principal vertical meridian, a plane dividing the lens into two symmetrical halves. The designer is constrained by the requirement that astigmatism vanish everywhere along the meridian line (i.e. the meridian line must be "umbilical"). Maitenaz discloses several explicit formulas for extrapolating the shape of the lens horizontally from an umbilical meridian.

U.S. Pat. No. 4,315,673 to Guilino describes a method in which mean power is specified along an umbilical meridian and provides an explicit formula for extrapolating the shape of the remainder of the lens.

In a Jul. 20, 1982 essay, "The TRUVISION® Progressive Power Lens," J. T. Winthrop describes a progressive lens design method in which the distance and reading zones are spherical. The design method described includes specifying mean power on the perimeters of the distance and reading zones, which are treated as the only boundaries.

U.S. Pat. No. 4,514,061 to Winthrop also describes a design system in which the distance and reading areas are spherical. The designer specifies mean power in the distance and reading areas, as well as along an umbilical meridian connecting the two areas. The shape of the remainder of the lens is determined by extrapolation along a set of level surfaces of a solution of the Laplace equation subject to boundary conditions at the distance and reading areas but not at the edge of the lens. The lens designer cannot specify lens height directly at the edge of the lens.

U.S. Pat. No. 4,861,153 to Winthrop also describes a system in which the designer specifies mean power along an umbilical meridian. Again, the shape of the remainder of the lens is determined by extrapolation along a set of level surfaces of a solution of the Laplace equation that intersect the umbilical meridian. No means is provided for the lens designer to specify lens height directly at the edge of the lens.

U.S. Pat. No. 4,606,622 to Furter and G. Furter, "Zeiss Gradal HS—The progressive addition lens with maximum wearing comfort", Zeiss Information 97, 55–59, 1986, describe a method in which the lens designer specifies the mean power of the lens at a number of special points in the progression corridor. The full surface shape is then extrapolated using splines. The designer adjusts the mean power at the special points in order to improve the overall properties of the generated surface.

U.S. Pat. No. 5,886,766 to Kaga et al. describes a method in which the lens designer supplies only the "concept of the lens." The design concept includes specifications such as the mean power in the distance zone, the addition power, and an overall approximate shape of the lens surface. Rather than being specified directly by the designer, the distribution of mean power over the remainder of the lens surface is subsequently calculated.

U.S. Pat. No. 4,838,675 to Barkan et al. describes a method for improving a progressive lens whose shape has already been roughly described by a base surface function. An improved progressive lens is calculated by selecting a function defined over some subregion of the lens, where the selected function is to be added to the base surface function. The selected function is chosen from a family of functions interrelated by one or a few parameters; and the optimal selection is made by extremizing the value of a predefined measure of merit.

In a system described by J. Loos, G. Greiner and H. P. Seidel, "A variational approach to progressive lens design", Computer Aided Design 30, 595–602, 1998 and by M. Tazeroualti, "Designing a progressive lens", in the book edited by P. J. Laurent et al., Curves and Surfaces in Geometric Design, A K Peters, 1994, pp. 467–474, the lens surface is defined by a linear combination of spline functions. The coefficients of the spline functions are calculated to minimize the cost function. This design system does not impose boundary conditions on the surface, and therefore lenses requiring a specific lens edge height profile cannot be designed using this method.

U.S. Pat. No. 6,302,540 to Katzman et al. discloses a lens design system that requires the designer to specify a curvature-dependent cost function. In the Katzman system, the disk of the lens is preferably partitioned into triangles. The system generates a lens surface shape that is a linear combination of independent "shape polynomials," of which there are at least seven times as many as there are partitioning triangles (8:17–40). The surface shape generated approximately minimize a cost function that depends nonlinearly on the coefficients of the shape polynomials (10:21–50). Calculating the coefficients requires inverting repeatedly matrices of size equal to the number of coefficients. Since every shape polynomial contributes to the surface shape over every triangle, in general none of the matrices' elements vanishes. As a result, inverting the matrices and calculating the coefficients take time proportional to at least the second power of the number of shape polynomials.

The inherent inaccuracy of the shape polynomials (10:10–14) implies that the disk must be partitioned more finely wherever the mean power varies more rapidly. These considerations set a lower limit on the number of shape polynomial coefficients that would have to be calculated, and hence the time the system would need to calculate the lens surface shape. Since the Katzman system requires time that is at least quadratic in the number of triangles to calculate the lens surface, the system is inherently too slow to return a calculated lens surface to the designer quickly enough for the designer to work interactively with the system. The inherent processing delay prevents the designer from being able to create a lens design and then make adjustments to the design while observing the effects of the adjustments in real-time.

None of the above design systems provides a simple method by which the lens designer can specify the desired optical properties over the entire surface of the lens and derive a design consistent with those optical properties. As a consequence, many of these prior systems result in optical defects in the outlying regions of the lens and unnecessarily steep gradients in mean power. Furthermore, the computational complexity of some of the prior systems result in a lengthy design process that does not permit the lens designer to design the lens interactively. Many of the prior systems also do not include a definition of the lens height around the periphery of the lens and therefore do not maximize the useful area of the lens.

BRIEF SUMMARY OF THE INVENTION

The present invention seeks to provide the lens designer with a means to specify as parameters both the mean power of the lens over its entire surface and the height of the lens around its boundary and to obtain the surface shape of the lens consistent with those parameters in time short enough for the designer to make use of interactively. Lens designs can be created which have smooth, continuous optical properties desirable for wearer comfort, ease of adaptation, and maximizing the effective usable area of the lens.

The present invention differs from previous design processes which generally start by modeling the lens surface shape directly, calculating optical properties, and then attempting to modify the surface shape so as to optimize optical properties. The prior art process of varying surface shape to achieve desired optical properties is unstable numerically. For this reason, previous design processes cannot be relied upon to generate lens designs quickly enough for the designer to use interactively. In contrast to previous design processes, the present invention starts with a prescription of the key optical property of mean power over the lens surface, together with the lens edge height, and then calculates the lens surface shape.

In accordance with the invention, mean power is specified at a plurality of points distributed over the entire surface of the lens and lens height is specified around the edge of the lens. Lens height is determined at the plurality of points consistent with the specified mean power and the lens edge height in part by finding a unique solution to a partial differential equation of the elliptic type subject to the lens edge height as a boundary condition.

The present invention preferably incorporates a method for redistributing astigmatism in the lens design. The method redistributes astigmatism more evenly over the surface of the lens and reduces peaks of astigmatism in critical areas. The present invention preferably also incorporates a method of creating special lens designs for left and right eyes whilst maintaining horizontal symmetry and prism balance.

The method of the present invention is preferably implemented using software executing on a computer to provide a system to define a lens surface shape in an interactive manner with smooth, continuous optical properties desirable for wearer comfort, ease of adaptation, and maximum effective use of the lens area.

The invention also comprises a progressive lens designed according to the disclosed design method. Preferred embodiments of a lens include a progressive lens having a distance area and a reading area wherein mean power over the lens surface varies according to a set of curves forming iso-mean power contours on the lens surface and a contour defining an area of constant mean power in the distance area is an ellipse with a ratio of major axis to minor axis in the range of about 1.1 to 3.0. Another preferred embodiment of a lens includes a distance area having a first mean power, a reading area having a second mean power higher than the first mean power, and a central area between the distance and reading areas with a width of at least about 10 millimeters wide and in which mean power increases smoothly and substantially monotonically throughout the central area in a direction from the distance area to the reading area.

The invention also comprises a system for designing progressive lens comprising a processor for accepting inputs defining mean power variation over a coordinate system covering the surface of the lens and defining lens height around the edge of the lens and for calculating lens height at a plurality of points over the lens surface by solving an elliptic partial differential equation subject to the lens height at the edge of the lens as a boundary condition, and a memory for storing the calculated lens height values. The lens design created using the system of the present invention is preferably manufactured using a CNC controlled grinding or milling machine using techniques well known in the art.

Further aspects of the invention are described hereinafter.

BRIEF DESCRIPTION OF THE DRAWINGS

The following is a description of certain embodiments of the invention, given by way of example only and with reference to the following drawings, in which.

DESCRIPTION OF ILLUSTRATIVE EMBODIMENTS

Certain embodiments of the invention will now be described, by way of example only, to illustrate the subject matter of the invention. The surface of a lens may be described by the equation z=f(x, y), where x, y, and z are rectangular Cartesian co-ordinates.

For brevity let $$\partial_x \equiv \frac{\partial}{\partial x}; \partial_y \equiv \frac{\partial}{\partial y}; \partial_x^2 \equiv \frac{\partial^2}{\partial x^2}; \partial_y^2 \equiv \frac{\partial^2}{\partial y^2}; \text{ and } \partial_{xy}^2 \equiv \frac{\partial^2}{\partial x \partial y}.$$

The principal radii of curvature $R_1$ and $R_2$ of the surface are the roots of the quadratic equation:

$$[rt-s^2]R^2 + h[2pqs-(1+p^2)t-(1+q^2)r]R + h^4 = 0 \qquad (1)$$

where $p \equiv \partial_x z$, $q \equiv \partial_y z$, $r \equiv \partial_x^2 z$, $s \equiv \partial_{xy}^2 z$, $t \equiv \partial_y^2 z$ and $$h \equiv \sqrt{(1+p^2+q^2)}.$$

See, e.g., I. N. Bronshtein & K. A. Semendyayev, "A Guide Book to Mathematics," Verlag Harri Deutsch, 1971, hereby incorporated by reference in its entirety.

The principal values of curvature are $1/R_1$ and $1/R_2$ respectively. The principal curvature difference $$\langle \delta \rangle \equiv \left| \frac{1}{R_1} - \frac{1}{R_2} \right|$$

is related to the optical property of astigmatism (also known as cylinder power) by D=1000(n−1)<δ> where D is measured in diopters, n is the refractive index, and distance is measured in millimeters.

The mean curvature $$\langle \mu \rangle \equiv \frac{1}{2}\left( \frac{1}{R_1} + \frac{1}{R_2} \right)$$

is similarly related to the optical property of mean power M=1000(n−1)<μ> also measured in diopters. As used herein, <μ> is the mean of the two principal curvatures, and <δ> is the absolute difference of the two principal curvatures.

In one embodiment of the present invention, the designer preferably prescribes M(x, y) and thus <μ>(x,y) over the entire lens area. For designing a progressive lens, mean power is prescribed over the entire lens surface using a preferred system of coordinates. This preferred system consists of a continuous set of non-mutually intersecting contours that collectively fill the entire area of the lens and a connecting path, with each contour line intersecting the connecting path once. The connecting path is a curve connecting a point in the distance area to one in the reading area. To specify the mean power in this preferred system of coordinates, the designer specifies how mean power varies along the connecting path and how mean power varies along each contour from its point of intersection with the connecting path. Preferably, variation in mean power along the connecting path should be described by a suitably smooth function ranging from a lower value in the distance area to a higher value in the reading area.

Figure 6:
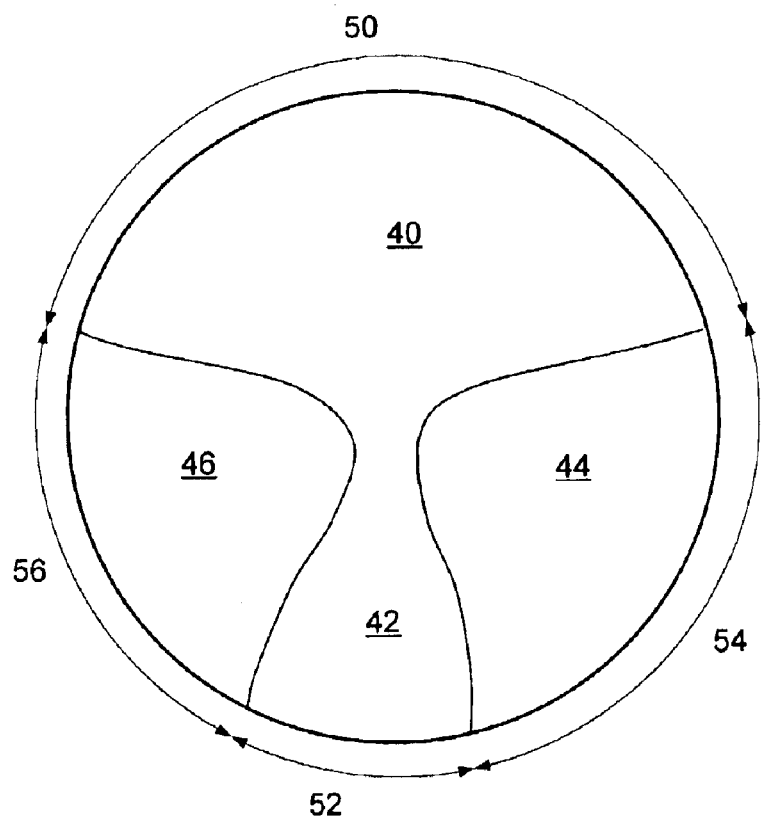
FIG. 6 is a vertical elevation view of the surface of a lens according to an embodiment of the current invention showing the boundary areas of the lens.

It is also preferred that lens height around the boundary be specified by a function that varies little near the distance and reading areas and gradually near the intermediate regions shown in FIG. 6. One way to construct such a function is as a smooth, piecewise composite of any of a wide variety of well-known elementary functions, such as polynomial, trigonometric, or gaussian functions.

The lens surface shape is then determined on the basis of the mean power distribution and lens height at the boundary. The preferred method is to solve a boundary value problem.

Unwanted astigmatism in critical areas may then be reduced and individual left and right lens designs may be created, as described in more detail below.

A. Prescribing Mean Power Over the Lens Surface

Figure 3:
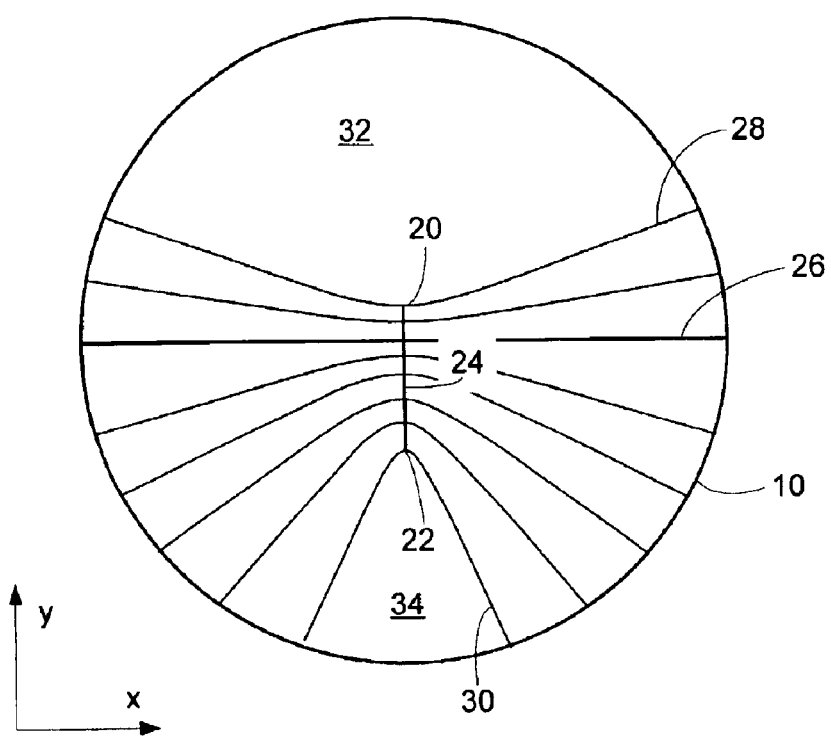
FIG. 3 is a diagram of a lens according to an embodiment of the current invention in vertical elevation view showing a connecting path and a representative subset of a system of contours intersecting the connecting path.

For a progressive lens of the present invention, a preferred method for prescribing the mean power M as a function over the entire lens area involves four steps. First, the designer selects points, $P_D$ in the distance area and $P_R$ in the reading area, and a path connecting those points. In one embodiment, both of the points and the connecting path lie along the left-right symmetry axis of the lens. Therefore in this embodiment the connecting path is referred to as the power profile meridian. FIG. 3 is a vertical elevation (plan view) of a progressive lens showing the selected points $P_D$ and $P_R$ shown as endpoints 20 and 22 at each end of connecting path (or power profile meridian) 24.

Figure 5:
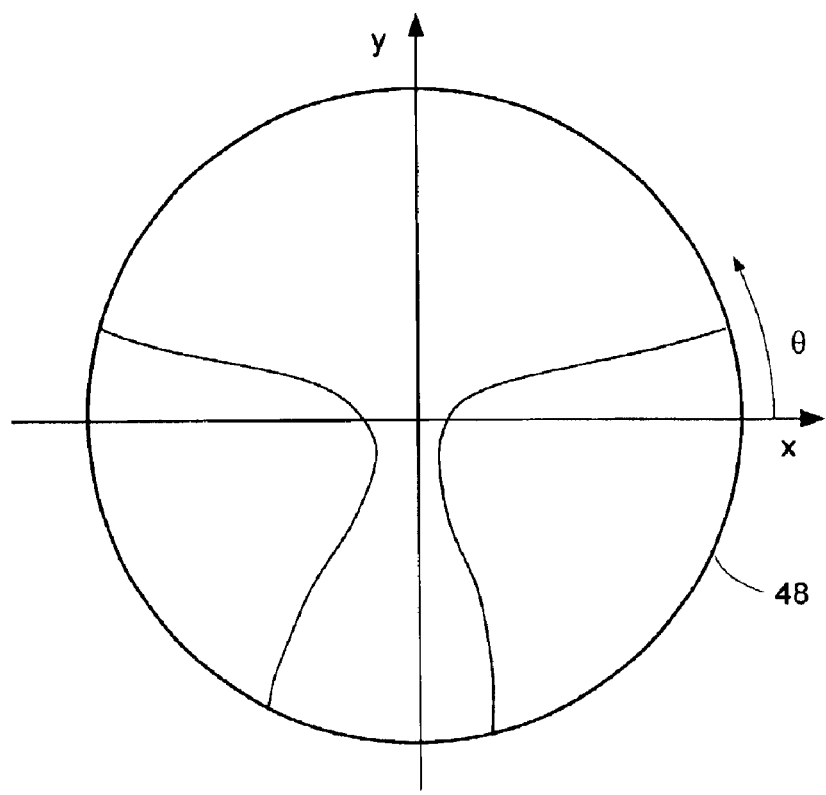
FIG. 5 is a vertical elevation view of the surface of a lens showing a preferred coordinate system comprising x- and y-axes and angle θ.

Second, a continuous set of contours is selected, subject to the conditions that each contour in the set intersects the power profile meridian once and no two contours in the set intersect one another. The curves in FIG. 3 within the lens boundary 10 are representative members of one example of such a continuous set of contours. In one preferred embodiment, the set of contours collectively fill the entire disk of the lens. In a second preferred embodiment, the designer may define a distance area 32 and reading area 34 of constant mean power. The set of contours collectively fill the remaining lens area. In the example shown in FIG. 3, curves 28 and 30 are contours that form the boundaries of the areas of constant mean power. In this example, the continuous set of contours consists of two families of hyperbolae:

$$\frac{x^2}{\xi_R^2} - \frac{(y-P_R)^2}{\varsigma_R^2} = 1 \text{ for } y \leq 0 \text{ and} \quad (2A)$$

$$\frac{x^2}{\xi_D^2} - \frac{(y-P_D)^2}{\varsigma_D^2} = 1 \text{ for } y \geq 0, \quad (2B)$$

where the x and y coordinates are defined according the coordinate system as shown in FIG. 5. As the parameters $\varsigma_r$ and $\varsigma_D$ vary, the set of contours fill the entire area between contours 28 and 30. For y=0, the two families of hyperbolae overlap, each including the equator 26 of the disk as a member when $\xi_D$ or $\xi_R$ is varied.

The set of contour lines illustrated in FIG. 3 is by no means an unique example of contours that can fulfill the conditions given above. Contours may be selected from families of curves other than conics, and from families of conics other than hyperbolae. In the second preferred embodiment, the set of contours could equally well consist of two families of ellipses. In one example of this embodiment, the contour forming the boundary of the distance area is preferably an ellipse with a ratio of major axis to minor axis in the range of about 1.1 to 3.0. It is also expected that contours may be selected from families of curves other than conics.

In a third step of a preferred method for prescribing the mean power over the lens, the designer prescribes a function specifying the variation in mean power along the power profile meridian. Preferably, the prescribed function takes into account criteria of wearer comfort and the intended use of the lens. Functions that meet such criteria may, for example, be linear combinations of elementary functions. One example of such a function is:

$$M(y) = M_D + \left[\frac{M_R - M_D}{2}\right]\left[1 - \cos\left(\pi\frac{y_D - y}{y_D - y_R}\right)\right]$$

where $M_D$ is mean power specified at a point $P_D=(0,y_D)$ in the distance area and $M_R$ is mean power specified at a point $P_R=(0,y_R)$ in the reading area.

Figure 4:
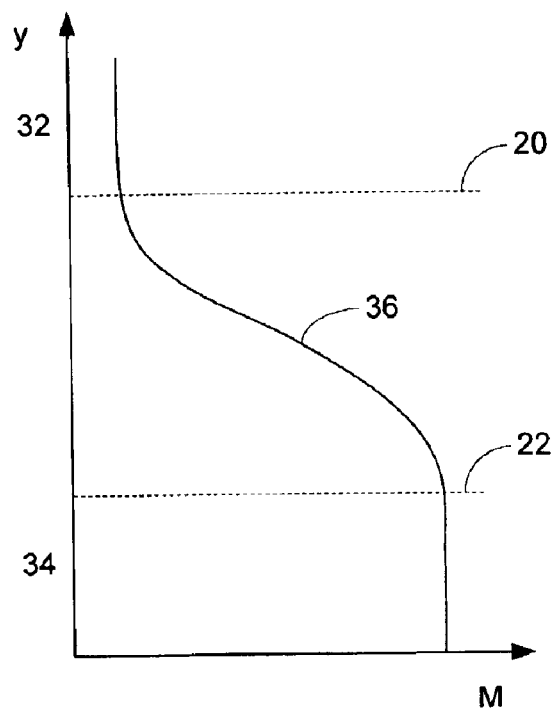
FIG. 4 is a graph showing an example of a function specifying mean power along the connecting path.

FIG. 4 is a graph of mean power M plotted against the y-axis of the lens along the length of the power profile meridian. The ends of the graph correspond to the endpoints 20 and 22 of the power profile meridian. A function 36 specifying mean power M along the power profile meridian is shown as an example of a suitable variation of mean power. In the example shown, mean power is constant in the distance area 32 and reading area 34.

Finally, in the fourth step of a preferred method for prescribing the mean power over the lens, the designer prescribes functions specifying the variation in mean power M along each of the contour lines. The mean power at the point where a contour intersects the power profile meridian equals the mean power specified at that point on the power profile meridian. Thus, defining the variation in mean power M along each of the contour lines completes the definition of mean power over the entire surface of the lens. One convenient choice consistent with this requirement is for mean power simply to remain constant along each contour. Other choices are also compatible with the disclosed embodiment.

B. Prescribing Lens Height at the Lens Boundary

In a preferred embodiment, the designer also prescribes the lens height at the edge of the lens. (As used herein, the terms "lens edge" and "lens boundary" are synonymous). The designer specifies a lens boundary height function $z(\theta)$ where z denotes the height of the lens and $\theta$ denotes the angular coordinate around the boundary of the lens. FIG. 5 illustrates the preferred convention for $\theta$ to be defined as the angle around the edge 48 of the lens in an anticlockwise direction starting at the x-intercept of the edge of the lens.

Preferably, the designer's specification of $z(\theta)$ takes into account criteria of wearer comfort and the intended use of the lens. Discontinuities or abrupt changes in $z(\theta)$ generally lead to image jumps that are uncomfortable for the wearer. Also, to be supported in an eyeglass frame a lens should be neither too thick nor too thin around its edge.

Figure 1:
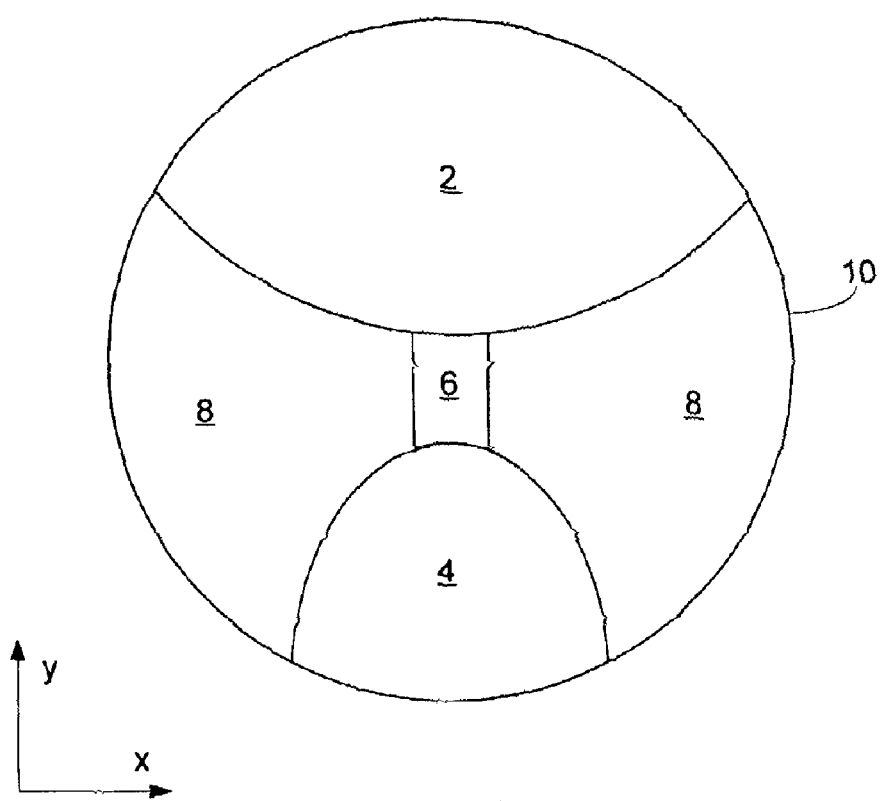
FIG. 1 is a diagram of a conventional progressive lens, shown in vertical elevation.
Figure 2:
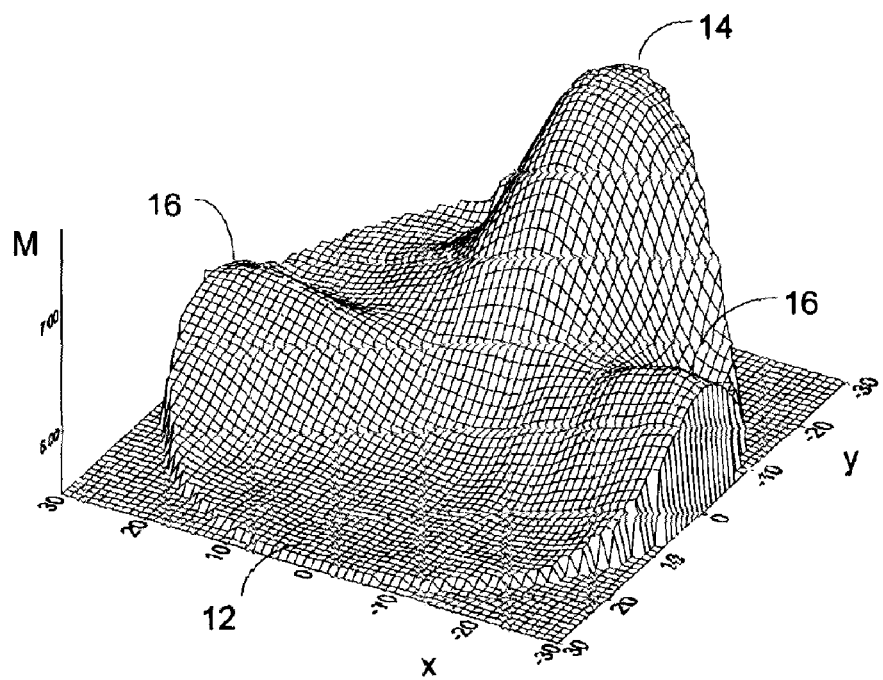
FIG. 2 is a three dimensional representation of the mean power distribution over the surface of a typical prior art progressive lens.

For a progressive lens, additional design criteria preferably apply to $z(\theta)$. FIG. 6, a vertical elevation (plan view) of the surface of a progressive lens, illustrates segments of the lens boundary that correspond roughly to adjoining areas of a typical progressive lens, illustrated in FIG. 1. Boundary segment 50 roughly adjoins distance area 40;

boundary segment 52 roughly adjoins reading area 42; and the boundary segments 54 and 56 roughly adjoin the outlying regions 44 and 46. To facilitate designs with relatively uniform optical properties in the distance and reading areas, it is preferred that $z(\theta)$ vary little within each of segments 50 and 52. To facilitate designs that do not produce uncomfortable image distortions at the lens periphery, it is preferred that in segments 54 and 56, $z(\theta)$ vary gradually so as to make substantially smooth transitions between segments 50 and 52. In order to fulfill these design criteria the designer may, for example, construct $z(\theta)$ from a smooth, piecewise composite of any of a wide variety of well-known elementary functions, such as polynomial or trigonometric functions.

Figure 7:
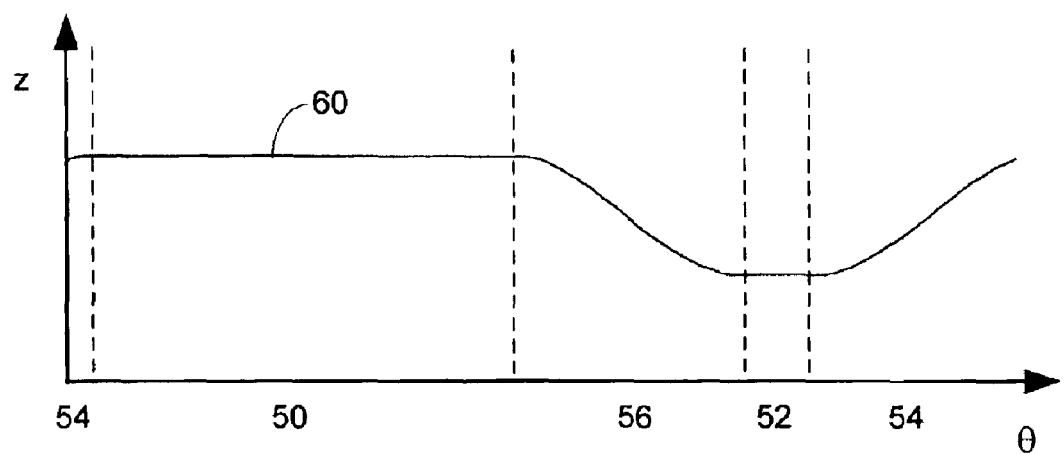
FIG. 7 is a graph showing an example of a lens boundary height function ranging from θ=0 to 360 degrees around the lens boundary.

FIG. 7 illustrates the preferred qualitative behavior of the lens boundary height function 60, showing lens boundary height z on the vertical axis plotted against angular coordinate $\theta$ on the horizontal axis, with $\theta$ varying from 0 to 360 degrees over lens boundary segments 50, 52, 54, and 56.

Within these criteria, some flexibility remains in the specification of $z(\theta)$ for a progressive lens. After examining the optical properties of a lens whose surface shape has been determined according to the present embodiment, a designer may exploit this flexibility by modifying $z(\theta)$. It has been shown that a typical progressive lens can be designed and optimized using the methods described herein in an hour or less, with each successive calculation of lens height distribution over the surface of the lens being performed in a matter of minutes. With the benefit of such rapid feedback, the designer may modify $z(\theta)$ in a way that leads to improved optical properties, such as lowered astigmatism, in critical areas of the lens.

C. Determining the Lens Surface Shape

When the mean curvature function $<\mu>$ is specified, the height function satisfies:

$$[\partial_x^2 + \partial_y^2]z = F \qquad (3)$$

where $$F = 2<\mu>[1+(\partial_x z)^2+(\partial_y z)^2]^{3/2}-[\partial_y z]^2\partial_x^2 z+2[(\partial_x z)(\partial_y z)]\partial_{xy}^2 z - [\partial_x z]^2\partial_y^2 z$$

The present embodiment determines the lens surface shape by solving equation (3) subject to the boundary condition that the lens edge height $z(\theta)$ is specified. Since equation (3) is a partial differential equation of the elliptic type, a unique, stable solution for the lens surface shape z must exist. To determine that solution, the present embodiment uses an iterative process to solve equation (3) numerically.

To establish a starting solution, a low power lens configuration, in which $|\partial_x z|<<1$ and $|\partial_y z|<<1$, is assumed. For this starting solution, $\partial_x z$, and $\partial_y z$ may be eliminated from equation (3), leading to a Poisson equation:

$$[\partial_x^2 + \partial_y^2]z = 2<\mu> \qquad (4)$$

The area of the lens is covered with a square mesh. Mean curvature $<\mu>$ is evaluated from M at mesh points; its values are proportional to $F^{(0)}$, a function of two discrete variables. Throughout, a function with a superscript in parentheses will be the function of two discrete variables representing the values at mesh points of the corresponding continuum function. $z^{(0)}$ at mesh points on the boundary of the disk represents values of $z(\theta)$ at those points. For mesh points near the boundary of the disk, the value of $z^{(0)}$ is a suitable average of nearby values of $z(\theta)$. Elsewhere on the mesh, $z^{(0)}$ need not be defined.

Superscripts in parentheses refer to the stage of the iteration. In the first iteration, the discrete analog of equation (4):

$$(\partial_x^2 z)^{(1)} + (\partial_y^2 z)^{(1)} = F^{(0)} \text{ with } F^{(0)} = 2<\mu> \qquad (5)$$

is solved to obtain $z^{(1)}$. $z^{(1)}$ is solved for at mesh points using the Successive Over-Relaxation (SOR) Technique. The SOR technique for solving elliptic equations is discussed in W. H. Press et al., "Numerical Recipes in C: The Art of Scientific Computing" (Cambridge University Press 1992) at sections 19.2 and 19.5, which are hereby incorporated by reference.

In subsequent iterations, equation (6), the discrete analog of equation (3)

$$(\partial_x^2 z)^{(n+1)} + (\partial_y^2 z)^{(n+1)} = F^{(n)} \qquad (6)$$

is solved to obtain $z^{(n+1)}$. For $n \geq 1$, $F^{(n)}$ includes all the terms shown in equation (3).

The values of $F^{(n)}$ are calculated at mesh points using the values of $z^{(n)}$ determined at mesh points in the previous iteration. The partial differentials of z that appear in F, as shown in equation (3), are calculated using central difference schemes, with special care being taken for mesh points near the circular boundary. Again, the SOR technique is used to solve for $z^{(n+1)}$ at mesh points.

The SOR technique employs a repetitive series of sweeps over the mesh to converge on a solution. The rate of convergence is dependent on the value of the Over-Relaxation Factor (ORF), and a preferred value of the ORF is determined experimentally. Once determined, the same ORF value is also preferred for solving similar equations, such as successive iterations of equation (6). (See Press et al., at section 19.5)

An important advantage of the SOR technique is that it reaches convergence in a time proportional to the square root of the number of mesh points. This feature implies that at modest cost in computational time, a sufficient mesh density can be implemented for SOR to converge to the solution of equation (6) that corresponds at mesh points to the unique solution of equation (3).

It has been found that five iterations of equation (6) will typically produce a satisfactory numerical solution of equation (3).

D. Reducing Unwanted Astigmatism in Critical Areas

Using the lens surface shape resulting from step C above, principal curvature difference $<\delta>$ can be calculated at every mesh point. Partial differentials of z that appear in $<\delta>$ are calculated using central difference schemes, with special care being taken for mesh points near the circular boundary.

Excessive astigmatism may be found in critical areas such as the central and reading areas. While astigmatism cannot be avoided entirely in a progressive lens design, astigmatism can be redistributed more evenly, away from critical areas.

Astigmatism in the central area, for example, can be reduced to improve optical performance there. A criterion for the maximum level of astigmatism acceptable in the central area, such as $D \leq 0.15*(M_R-M_D)$, could be imposed. Here, $M_D$ is mean power specified at point $P_D$ in the distance area and $M_R$ is mean power specified at point $P_R$ in the reading area.

Assume that the lens shape is symmetrical about the centerline, so that $z=f(x, y)$ with $f(-x, y)=f(x, y)$. Then along the centerline, $p=0$ and $s=0$ and the mean curvature $<\mu>$ and principal curvature difference $<\delta>$ are respectively given by equation (7):

$$\langle \mu \rangle = \frac{(t+h^2 r)}{2h^3} \quad \text{and} \quad \langle \delta \rangle = \frac{(t-h^2 r)}{h^3}. \tag{7}$$

To make astigmatism D vanish exactly along the centerline, it would be necessary for t to be made equal to $h^2 r$ and mean curvature $<\mu>$ made equal to $r/h$. Therefore the $<\mu>$ function would have to be modified according to equation (8):

$$<\mu>(0,y) \to <\mu>(0,y) + \Delta<\mu>(0,y) \tag{8}$$

where $$\Delta\langle\mu\rangle(0, y) \equiv \frac{r}{h}\bigg|_{(0,y)} - \langle\mu\rangle(0, y) = \frac{\partial_x^2 z}{\sqrt{1+(\partial_y z)^2}}\bigg|_{(0,h)} - \langle\mu\rangle(0, y) \tag{9}$$

To reduce astigmatism D in the central area and at the same time distribute changes in mean power M across the lens, a spreading function $\sigma(x)$ can be employed:

$$<\mu>(x,y) \to <\mu>(x,y) + \sigma(x) \Delta<\mu>(0,y) \tag{10}$$

$\sigma(x)$ may be any smoothly-varying function that takes the value 1 at $x=0$. One example of such a function is:

$$\sigma(x) = \begin{cases} \exp(-k^2(x-x_L)^2) & |x < x_L \\ \exp(-k^2(x-x_R)^2) & |x > x_R \\ 1 & |x_L \leq x \leq x_R \end{cases} \tag{11}$$

where $x_R$ and $-x_L$ take equal values prior to handing and create a constant region for the spreading function $\sigma(x)$. The parameter k controls the rate of decay of $\sigma(x)$ to the left and to the right of the constant region. The mean curvature function $<\mu>(x,y)$ resulting from equations (8), (9) and (10) can be calculated at mesh points and is used to completely recalculate the surface height function z in the manner described in step C.

In the complete recalculation of z with a selected $\sigma(x)$, the derivatives involved in equation (9) will of course in general adopt new values. As a result, the mean curvature function $<\mu>(x,y)$ will also adopt new values. The variables z, $<\mu>$, and $<\delta>$ are recalculated repeatedly, with repetition halting at the discretion of the designer. If necessary the values of $x_L$, $x_R$, and k can themselves be changed during this process.

Astigmatism can be reduced similarly in any critical area, first by determining the local change in M required to make D vanish exactly in the area, and then by distributing the change in M across the lens. The result is a set of modified values of M at mesh points. The modified M is plugged back into step C at equation (5) to obtain a modified lens surface function z at mesh points. The modified z, in turn, is used to recalculate the astigmatism D at mesh points, and the whole process may be repeated until the distribution of astigmatism is found acceptable.

E. Optimizing the Mean Power Distribution Around the Power Profile Meridian

Figure 9:
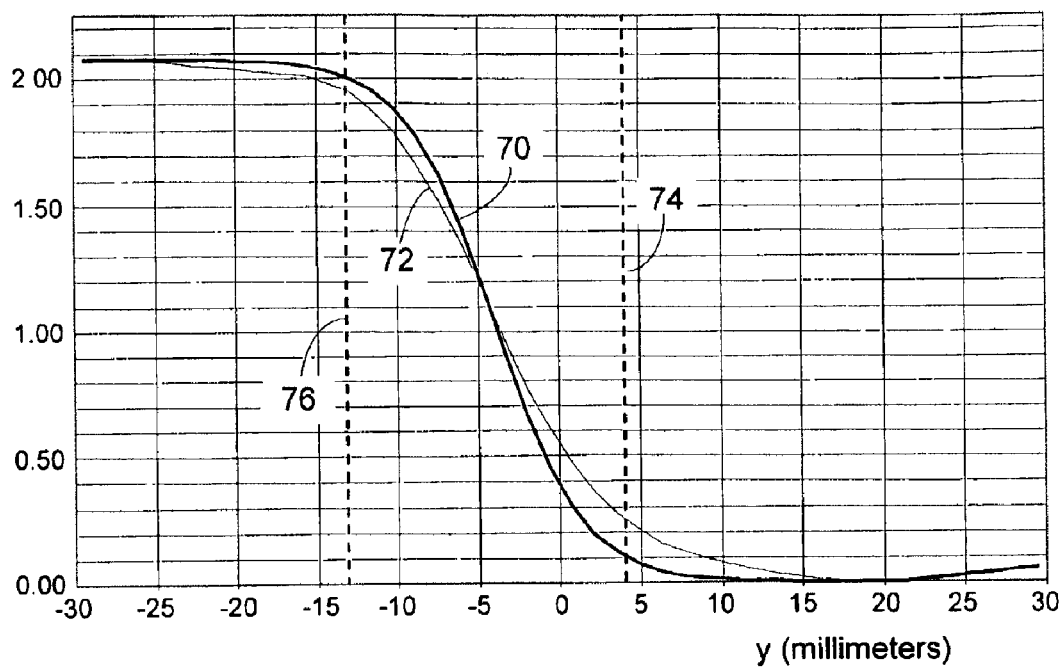
FIG. 9 is a graph showing an example of optimizing the mean power profile along the connecting path.

As a result of changing the mean power to reduce unwanted astigmatism, it may be found that the mean power in certain critical areas is no longer what the designer desires. FIG. 9 shows an example of a mean power profile after reducing the astigmatism (line 72). For a typical design, it will be desired to maintain the mean power below a certain value at the fit point (line 74). It will also be desired for the mean power to reach the correct addition power, in this example 2.00 diopters, at the addition measuring point (line 76). To achieve the desired mean power profile, without raising the astigmatism levels significantly, the mean power can be altered locally. This is shown by line 70 in FIG. 9, and this alteration is made over some limited width in the x direction of, for example, 12 to 16 mm. The modified mean can be distributed across the lens in a simple linear fashion. The new M distribution is plugged back into step C at equation (5) to obtain a modified lens surface function z at mesh points. The modified z, in turn, is used to recalculate the astigmatism D at mesh points, so that it can be checked to be within acceptable limits. The whole process may be repeated until the distribution of mean and astigmatism is found acceptable.

F. Designing Left and Right Lenses

Once an acceptable lens shape has been obtained, right-hand and left-hand versions are designed in order to minimize binocular imbalance. Contrary to previous approaches to the handing problem, the direct control of handing mechanics resides in the mean curvature and edge height prescriptions. In order to accomplish this handed lenses are designed by rotating both the mean curvature $<\mu>(x,y)$ and the boundary height $z(\theta)$ in an angle-dependent manner. Specifically, $$<\mu>(\rho,\theta) \to <\mu>(\rho,H(\theta)) \tag{12}$$

$$z(\theta) \to z(H(\theta)) \tag{13}$$

where $(\rho,\theta)$ are polar coordinates corresponding to $(x, y)$. The handing function H is of the form:

$$H(\theta) = h_0 \begin{cases} \exp\left(-K^2\left(\theta - \frac{3\pi}{2} + \omega\right)^2\right) & |\theta < \frac{3\pi}{2} - \omega \\ \exp\left(-K^2\left(\theta - \frac{3\pi}{2} - \omega\right)^2\right) & |\theta > \frac{3\pi}{2} + \omega \\ 1 & |\frac{3\pi}{2} - \omega \leq \theta \leq \frac{3\pi}{2} + \omega \end{cases} \tag{14}$$

where $h_0$ is the handing angle, $\omega$ controls the undistorted portion of the handed reading region, and K determines the nature of the regions ahead of and behind the pure rotation. Typical values of these parameters could be $h_0=9$ degrees, $\omega=30$ degrees, and $K=1.5$. The mean curvatures and edge height values are plugged into step C at equation (5) to obtain a recalculated lens surface function $z(x, y)$ at mesh points.

Figure 8:
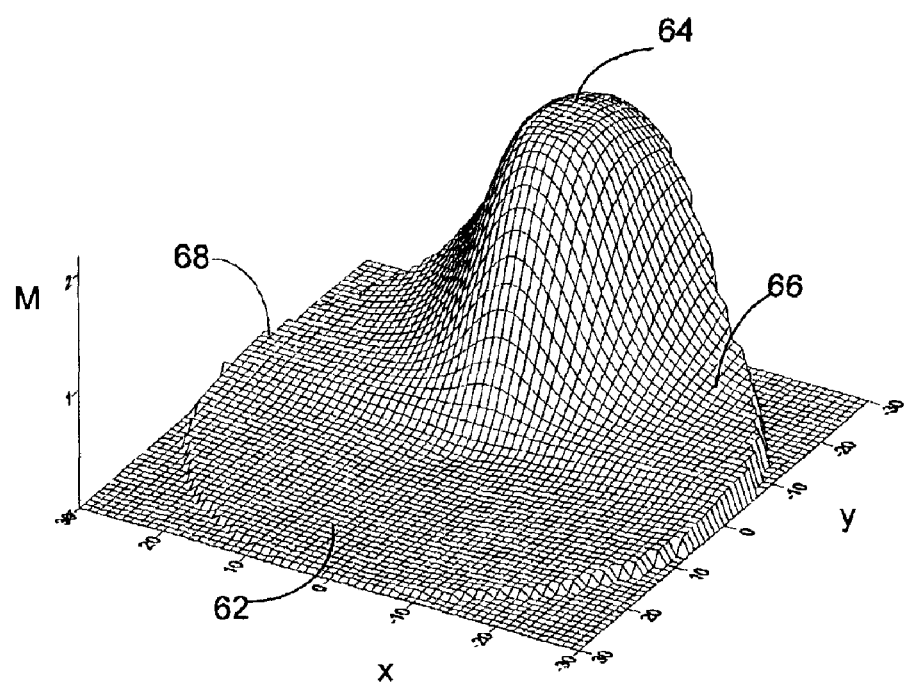
FIG. 8 is a three dimensional representation of a theoretical mean power distribution over the surface of a lens according to an embodiment of the present invention.

FIG. 8 is a three dimensional representation of a theoretical mean curvature distribution over the surface of a lens according to an embodiment of the current invention. Mean curvature M is graphed in the vertical direction. M is graphed as a function of x and y, which are shown as the two horizontal directions. The disc of the lens is viewed from an angle less than 90° above the plane of the lens. Since the distance area is shown in the foreground and the reading area at the background of FIG. 8, y increases in the background-to-foreground direction. As can be seen, there is a region of lesser mean curvature 62 in the distance area and greater mean curvature 64 in the reading area. The mean power transitions smoothly and increases substantially monotonically with increasing y throughout the optically critical area between the distance area and the reading area as well as in the outlying areas 66 and 68.

G. An Example Lens Design

Figure 10:
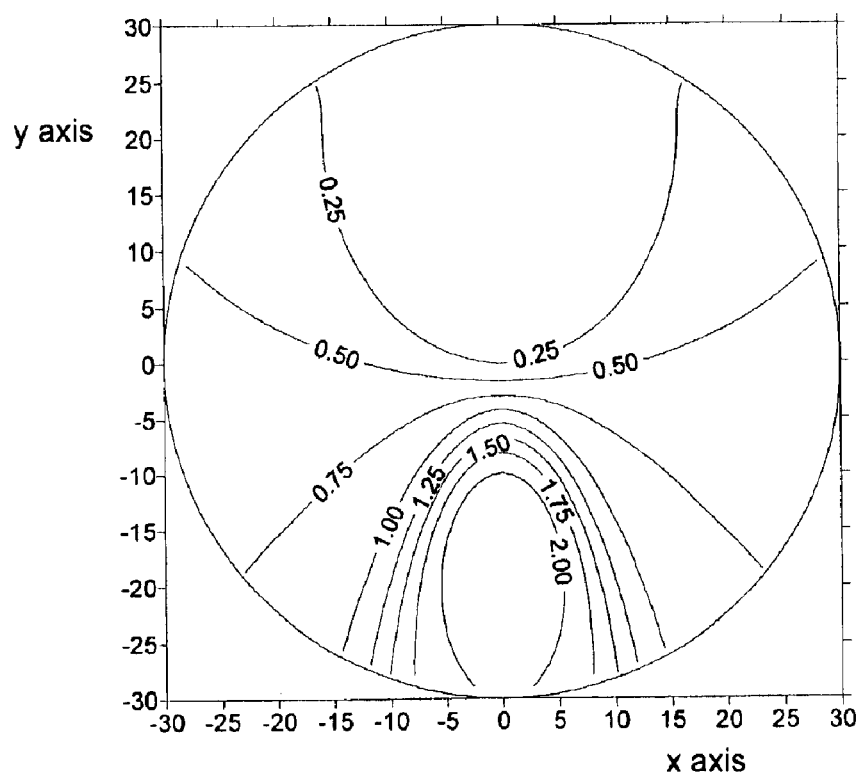
FIG. 10 is a vertical elevation view of the surface of a lens showing an example of mean power distribution over a family of iso-mean power ellipses.
Figure 11:
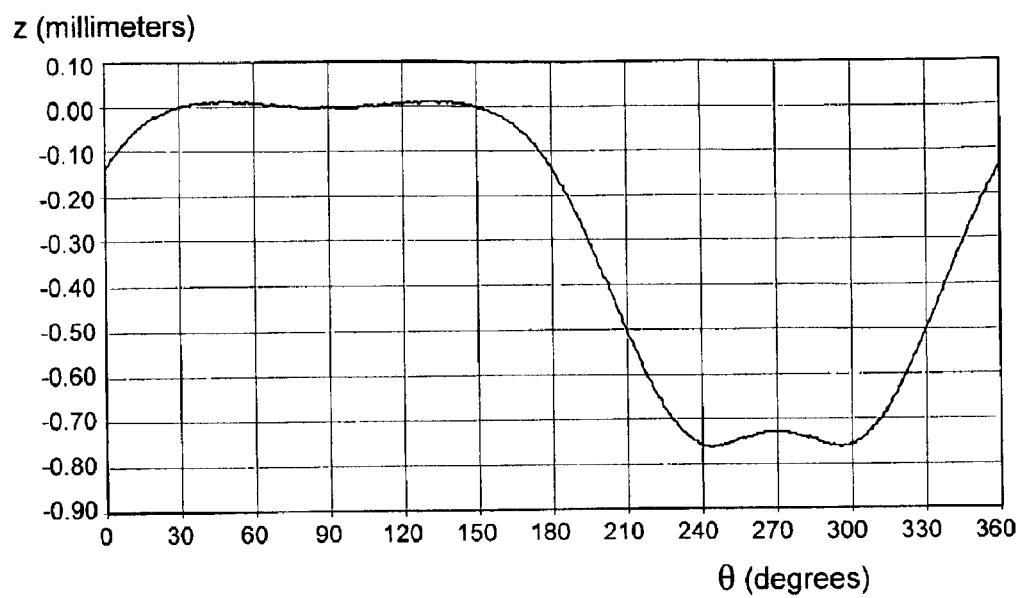
FIG. 11 is a graph showing an example of an edge height profile around the periphery of a lens.

The following is an example of a lens design produced using methods comprising the present invention. A mean power distribution is initially defined for the complete surface of the lens. A suitable distribution using a family of iso-mean power ellipses can be seen in FIG. 10, in which contour lines are shown having mean power values between 0.25 to 2.00 diopters in increments of 0.25 diopters. To completely define the entire surface it is also necessary to specify the lens height around the edge of the lens. An example of a suitable lens edge height function is shown in FIG. 11. This figure shows the lens surface height z in millimeters referenced from the edge of the distance area. These parameters are used as inputs for equation (10), discussed above in step C, and the equations are solved for the surface heights z over the complete surface. The solution is derived numerically using a high-speed digital computer, using software and programming techniques well known in the art. A suitable machine would be a personal computer with a Pentium III or later processor, such as a Compaq EVO D300. The computation time required to solve the boundary value problem is approximately proportional to the square root of the number of points at which the height is calculated.

Figure 12:
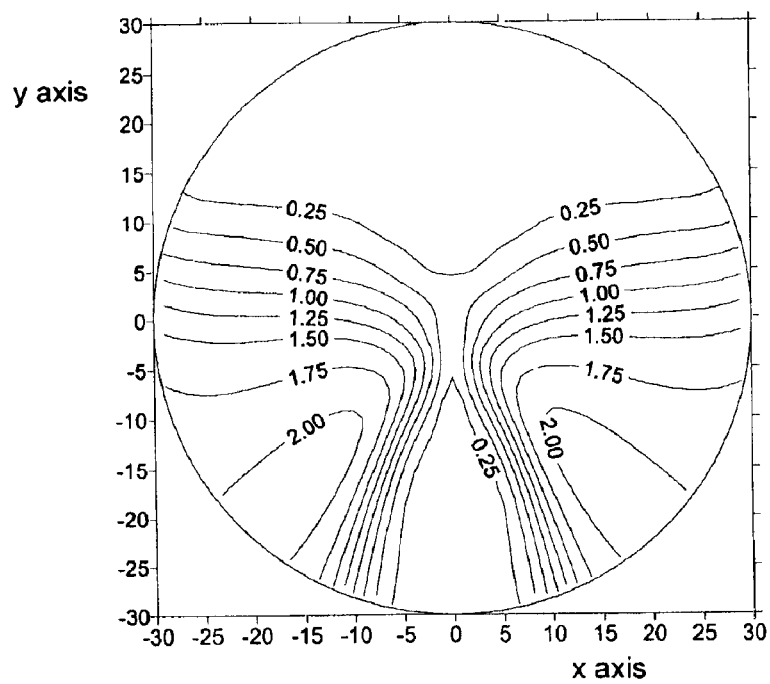
FIG. 12 is a vertical elevation view of the surface of a lens showing an example of the distribution of astigmatism resulting from the mean power distribution of FIG. 10 and edge height profile of FIG. 11.

From the resultant z height values, the distribution of astigmatism and sphere power can be calculated for the design. Although the distribution of sphere power can in principle be calculated directly from the defined mean power distribution and the calculated distribution of astigmatism, calculating the distribution of sphere power from the resultant z height values is useful to confirm that those z height values are consistent with the defined mean power distribution. FIG. 12 shows the distribution of astigmatism resulting from the mean power distribution and lens edge height function of FIG. 10 and FIG. 11.

Figure 13:
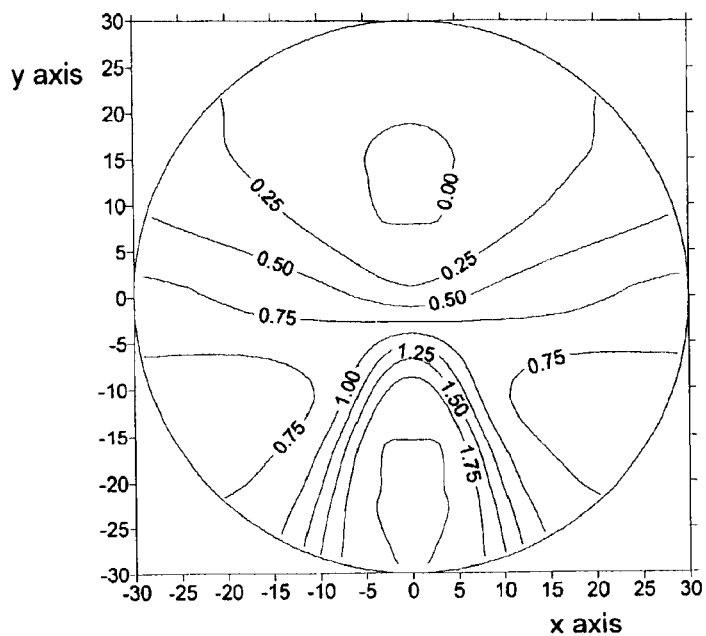
FIG. 13 is a vertical elevation view of the surface of a lens showing an example of altered mean power distribution to reduce astigmatism along the centerline.
Figure 14:
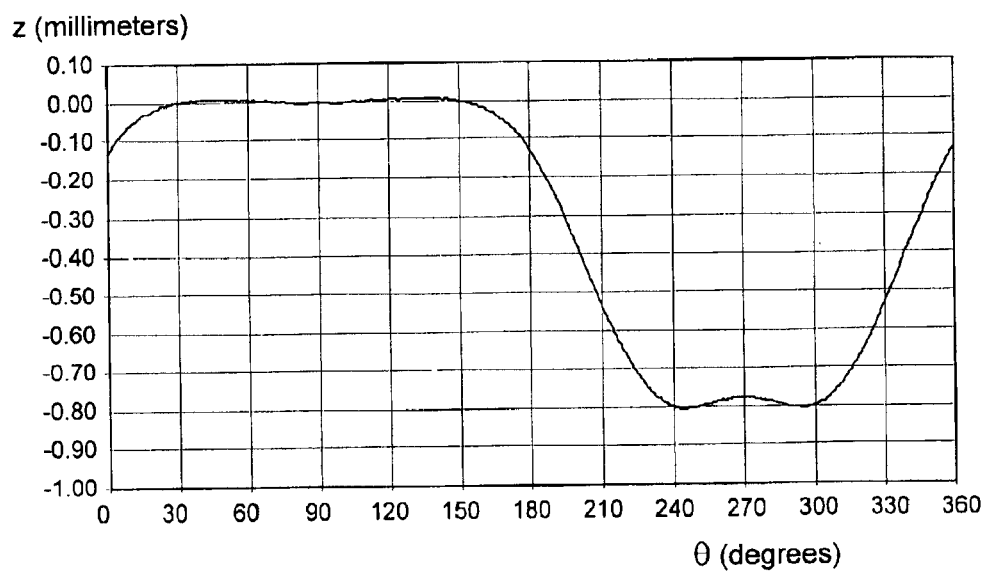
FIG. 14 is a graph showing an example of an altered edge height profile.
Figure 15:
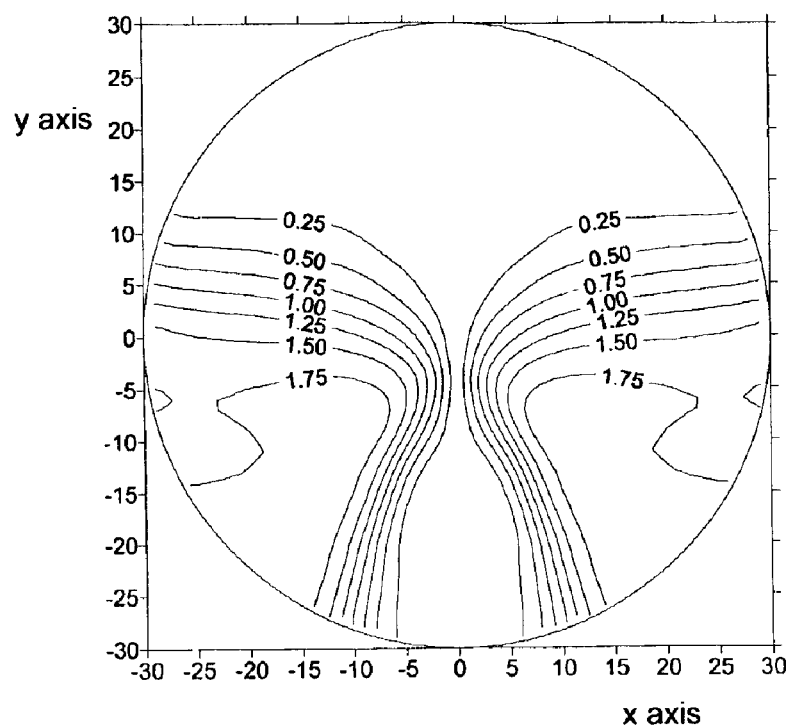
FIG. 15 is a vertical elevation view of the surface of a lens showing an example of the redistribution of astigmatism resulting from the altered mean power distribution of FIG. 13 and altered edge height profile of FIG. 14.

The next step is to reduce the astigmatism in the central corridor area to an acceptable level. This reduction is achieved by alteration in the mean power distribution according to equations (8), (9) and (10) described above. The resulting altered mean power distribution is shown in FIG. 13. To take criteria of patient comfort into account as is preferred, the lens edge height function may also be altered, and an example of an altered lens edge height function is shown in FIG. 14. The altered mean power and edge height function are then used to recalculate the distribution of surface heights z over the complete surface by solving equation (5) as before. An astigmatism distribution derived from the recalculated surface height distribution is shown in FIG. 15. This step may be repeated until the designer finds the astigmatism distribution acceptable.

Figure 16:
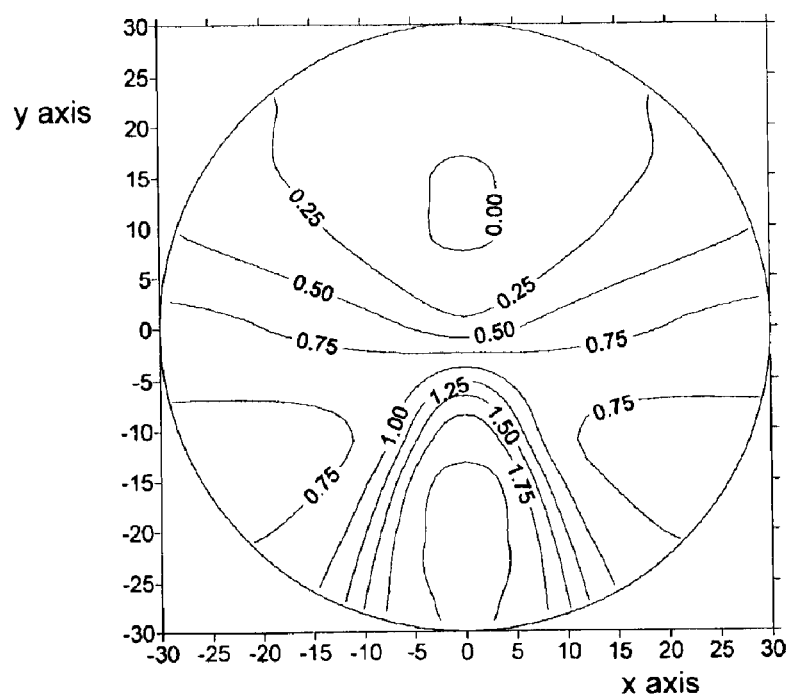
FIG. 16 is a vertical elevation view of the surface of a lens showing an example of a mean power distribution incorporating the change in mean power profile along the connecting path as shown in FIG. 17.
Figure 17:
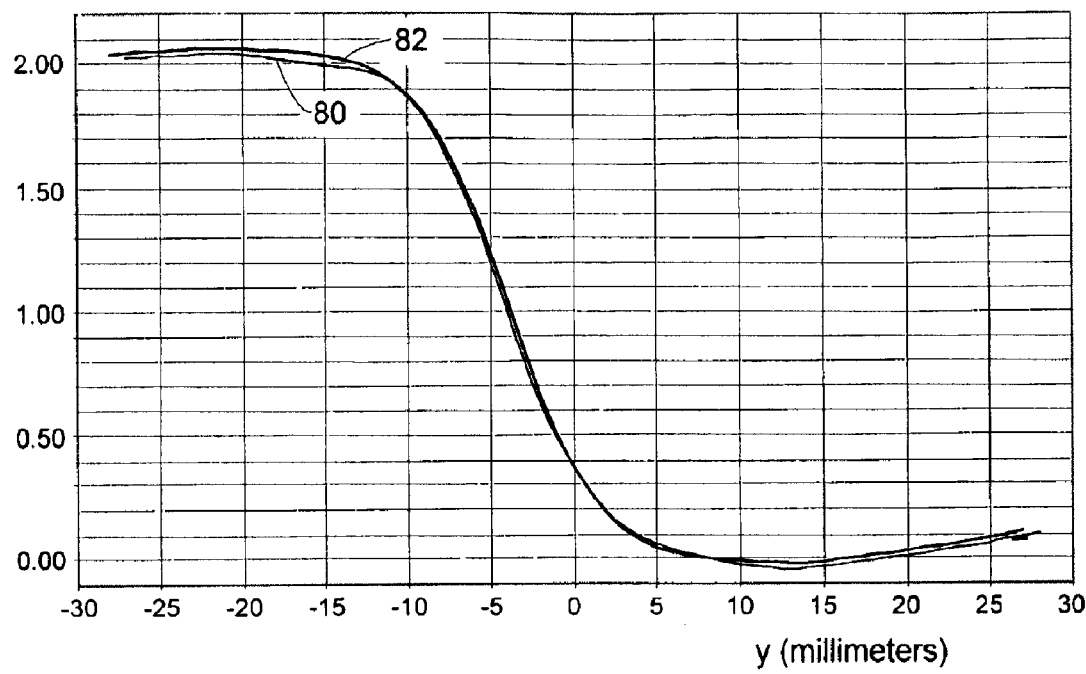
FIG. 17 is a graph showing an example of change in the mean power profile along the connecting path to optimize the mean power in the central corridor area.
Figure 18:
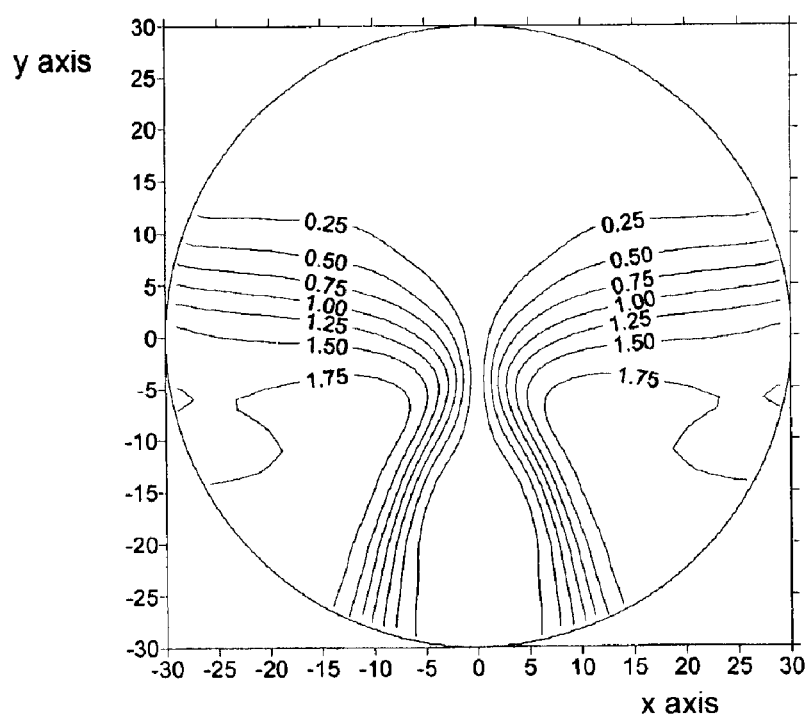
FIG. 18 is a vertical elevation view of the surface of a lens showing an example of an astigmatism distribution derived from the recalculated surface height distribution.

An example of the changes caused in the mean power profile along the centerline to reduce astigmatism in the central corridor area is shown in FIG. 17. Having found that the astigmatism in the central corridor area has been reduced to acceptable levels, the designer may find that the mean power profile along the centerline no longer complies with what was originally desired. As shown in FIG. 17 for example, in the addition area, the mean power at the addition measurement point (−13 mm) is below the desired 2.00 diopters. Then the mean power profile must be optimized according to step E above. The optimized mean power profile over a 12 mm width surrounding the centerline of the lens is then used as input to recalculate the distribution of surface heights z by again solving equation (5). A mean power distribution incorporating the changes shown in FIG. 17, is shown in FIG. 16. The altered mean power and the previous edge height profiles function are then used to recalculate the distribution of surface heights z over the complete surface by solving equation (5) as before and an astigmatism distribution derived from the recalculated surface height distribution is shown in FIG. 18.

Figure 19:
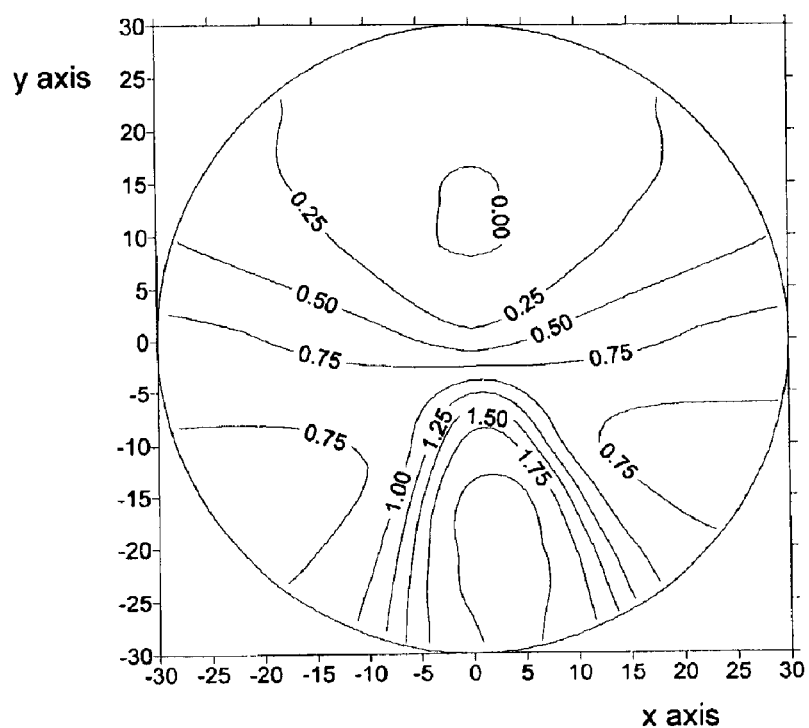
FIG. 19 is a vertical elevation view of the surface of a lens showing an example of a rotated mean power distribution.
Figure 20:
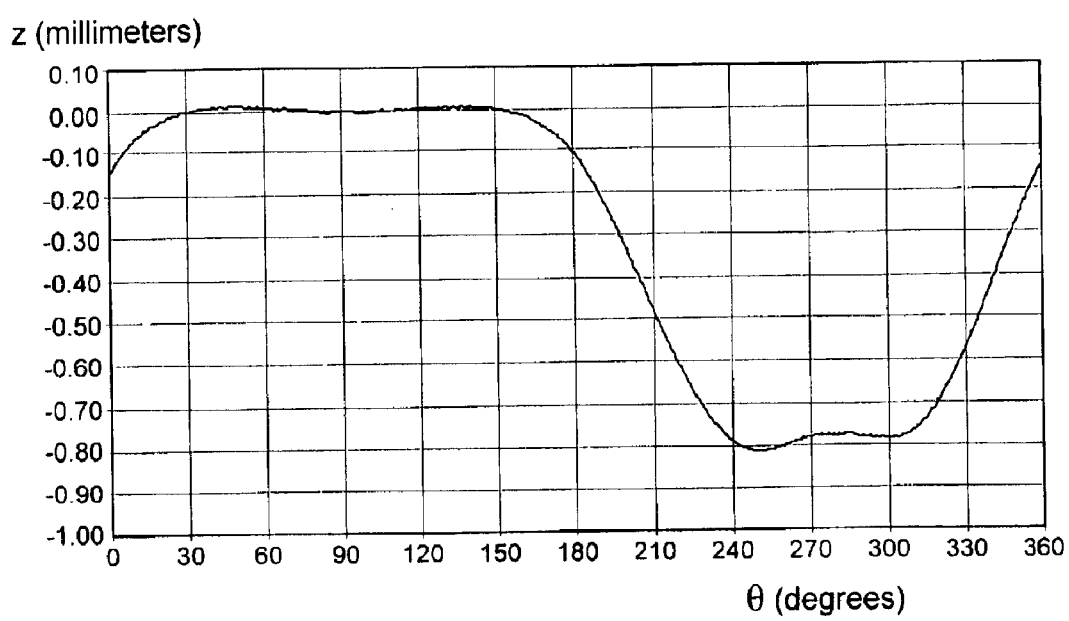
FIG. 20 is a graph showing an example of a rotated edge height profile.
Figure 21:
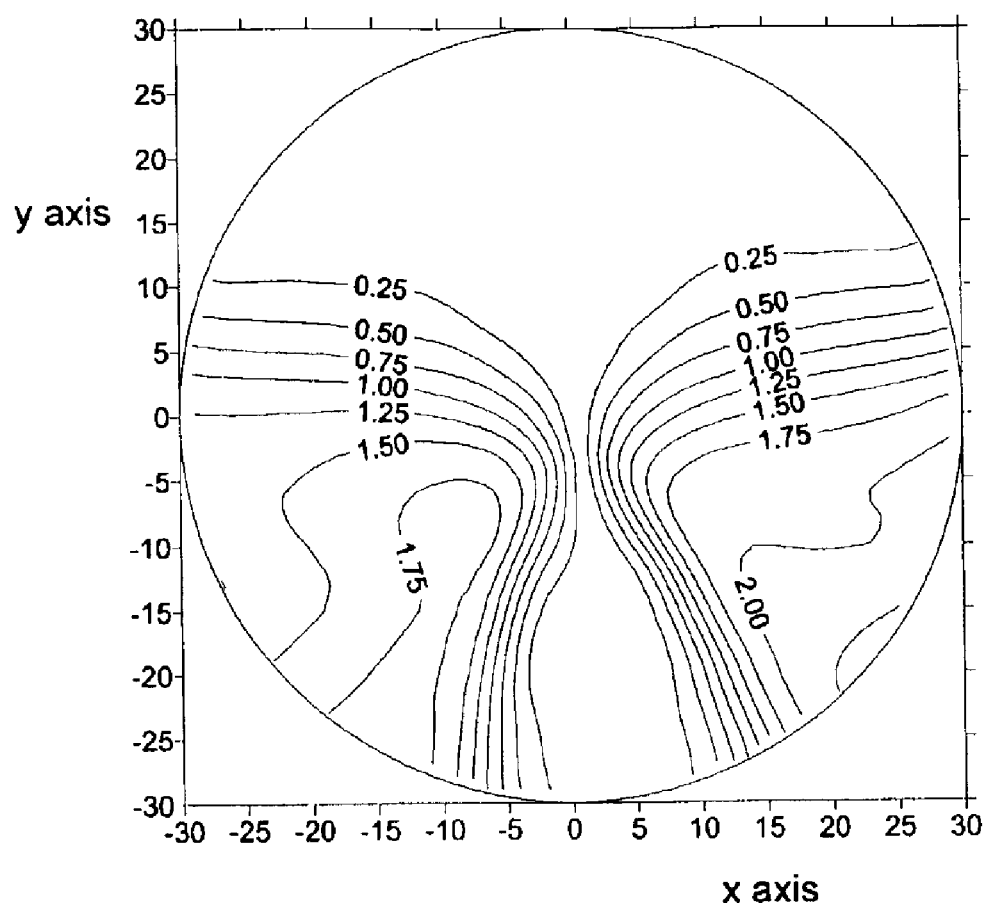
FIG. 21 is a vertical elevation view of the surface of a lens showing an example of astigmatism distribution resulting from the rotated mean power distribution of FIG. 19 and rotated edge height profile of FIG. 20.

Finally the design has to be handed for use in a left or right eye of a spectacle frame. This is achieved by rotating both the mean power distribution and lens edge height function as described in step F above and once again recalculating the distribution of surface heights z by solving equation (5) described above. An example of a rotated mean power distribution is shown in FIG. 19 and an example of a rotated edge height function in shown in FIG. 20. After recalculating surface heights z, the astigmatism distribution is again derived. An example of such an astigmatism distribution can be seen in FIG. 21.

As can be seen by FIG. 19, the completed lens design includes a distance area with relatively lower mean power in the top part of the lens and a reading area with relatively higher mean power in the bottom part of the lens. Throughout a central area that extends between the distance and reading areas, mean power increases smoothly and substantially monotonically in the direction from the distance area to the reading area. In a preferred embodiment, this central area is at least 30 millimeters wide, but may vary about this width according to the lens design. In some designs the minimum width of the central portion may be about 20 millimeters wide, or may be about 10 millimeters wide.

The resulting distribution of surface heights z can then be used in any of the following ways:
   a. To directly machine the progressive surface onto a plastic or glass lens;
   b. To directly machine a glass or metal mould which will be used to produce a progressive plastic lens by either casting or molding; or
   c. To machine a ceramic former in either a convex form which will be used to produce a glass progressive lens by a slumping process, or a concave form which will be used to produce a glass mould by a slumping process from which a plastic progressive lens can be cast.

As discussed above, the calculation of the surface heights z is preferably performed on a computer. The resulting data representing the distribution of surface heights is preferably stored in the computer's memory, and may be saved to a hard disk drive, CD-ROM, magnetic tape, or other suitable recording medium.

The machining is preferably performed by electronically transmitting the surface height data to a computer numerically-controlled (CNC) milling or grinding machine. Examples of suitable CNC machines include a Schneider HSC 100 CNC to directly machine the progressive surface onto a plastic or glass lens, a Mikron VCP600 to machine a glass or metal mould, and a Mikron WF32C or Schneider HSG 100 CNC to machine a ceramic former, although other suitable machines are well known to those of skill in the art.

In each of the above cases the distribution of surface heights z must be post-processed to suit the particular CNC controller on the grinding/milling machine used. Compensation must also be built in to the surface geometry depending on the size and type of grinding tool/cutter used to ensure that the design surface is produced. In the case of machining ceramic formers for use with a slumping process, further compensation must be built into the distribution of surface heights z to take care of unwanted geometry changes. These result from the bending and flowing of the glass as it is heated up to its softening temperature, to allow it to take up the shape of the ceramic former.

Lenses produced according to the present invention need not have a circular outline. As part of any of the above manufacturing procedures, lenses may be glazed into a variety of outlines for a variety of spectacle frames. Furthermore, the lens edge height used in the calculation of lens surface heights z need not be the physical edge of the lens blank. For example, a typical 70 millimeter circular lens blank may have edge heights defined 10 millimeters in from the actual edge of the lens blank, depending on the size of the lens ultimately required. In this example, the designer's specification of mean power and the calculation of lens surface heights z will apply for the lens area within the boundary at which lens edge height is defined, rather than for the entire surface of the lens blank.

Figure 22A:
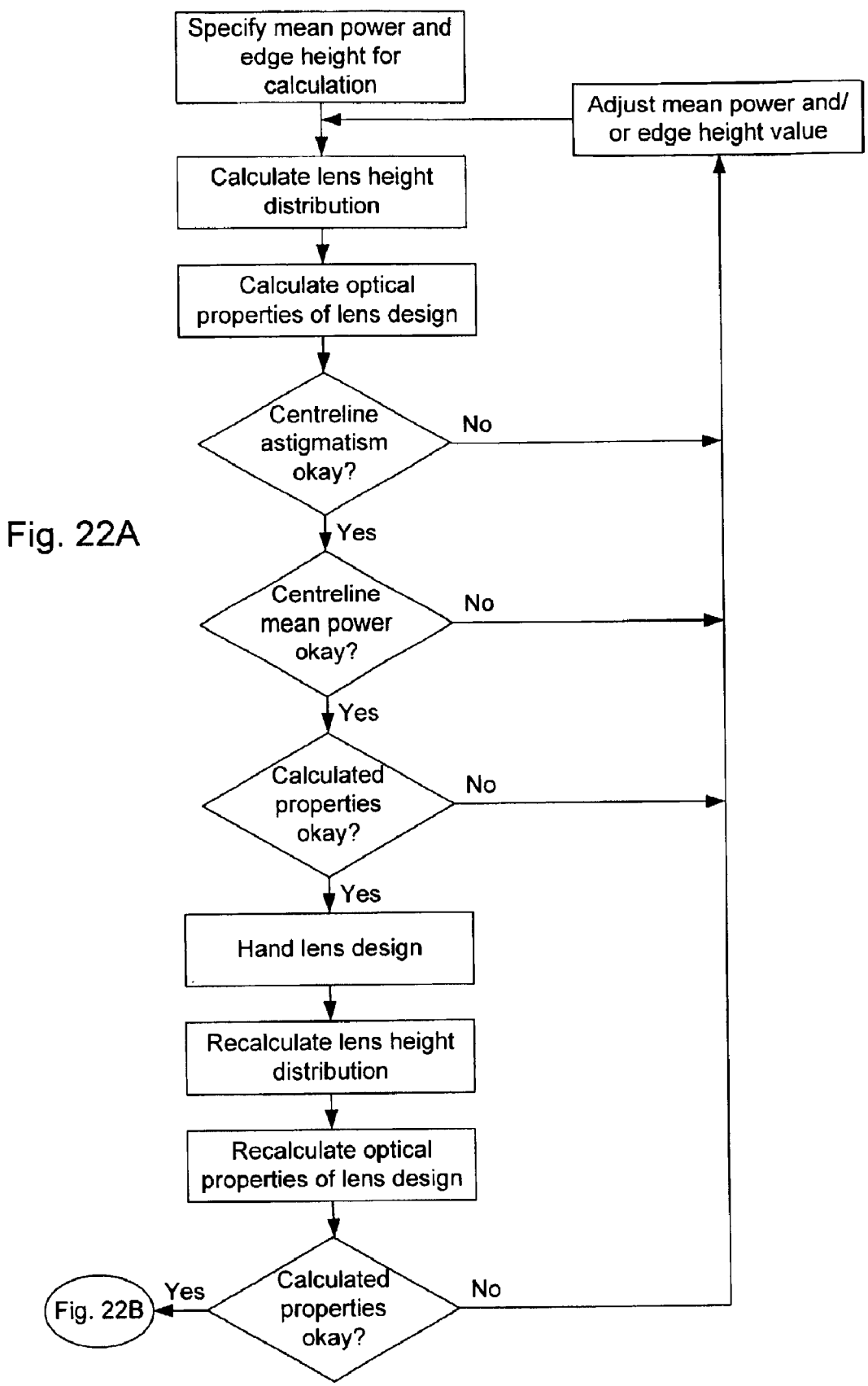
FIG. 22 is a flowchart showing the major steps of one embodiment of the design method of the present invention.
Figure 22B:
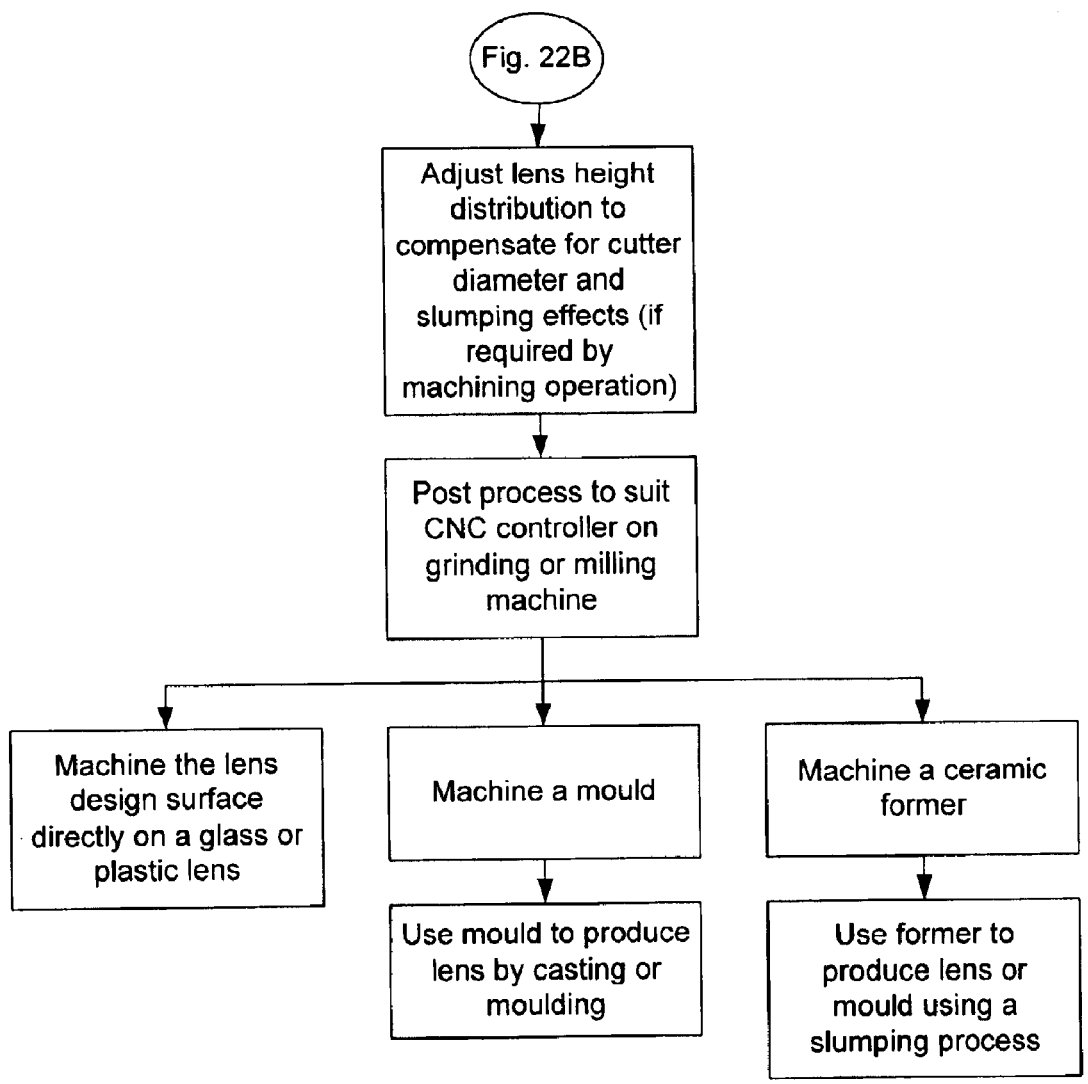

A flow chart showing the process described above is provided in FIG. 22. The flowchart illustrates each of the main steps involved in the design and manufacturing process for a progressive lens as described above. It should be noted that FIG. 22 describes only one example of a design and manufacturing process and not all of the steps shown in the flow chart may be necessary for a given lens design.

Thus an improved method for designing progressive addition power ophthalmic lenses has been described. It will be appreciated that the method has been described in terms of several embodiments, which are susceptible to various modifications and alternative forms. Accordingly, although specific embodiments have been described, these are examples only and are not limiting upon the scope of the invention.

What is claimed is:

1. A method for designing a progressive lens surface comprising:

specifying mean power at a plurality of points distributed over the entire surface of the lens;

specifying lens height around the edge of the lens; and determining lens height at the plurality of points consistent with the specified mean power and lens edge height, comprising finding a unique solution of a partial differential equation of the elliptic type subject to a boundary condition of the lens edge height.

2. The method of claim 1, wherein finding the unique solution of the partial differential equation comprises:

employing a successive over-relaxation technique to converge on the solution; and determining an over-relaxation factor to most efficiently relax the equation.

3. The method of claim 2, wherein the step of determining the lens height at a plurality of points comprises:

defining a mesh comprising a plurality of points over the surface of the lens;

determining mean power at each point on the mesh as defined by the specified mean power distribution over the lens surface; and numerically solving on the mesh a partial differential equation of the elliptic type, subject to the lens edge height as a boundary condition, to determine the lens height at each point of the mesh.

4. The method of claim 3, wherein the lens comprises a distance area and a reading area, and wherein the step of specifying mean power further comprises:

specifying mean power along a connecting path extending from a first point in the distance area to a second point in the reading area; and specifying mean power over a coordinate system distributed over the surface of the lens consistently with the mean power specified along the connecting path.

5. The method of claim 4, wherein the coordinate system comprises a set of contour lines, each contour line intersecting the connecting path, and wherein specifying mean power over the coordinate system further comprises specifying mean power variation along the contour lines as a function, the mean power on a contour line and the mean power on the connecting path being equal at every point where a contour line intersects the connecting path.

6. The method of claim 5, further comprising rotating in a controlled manner the specified mean power values with respect to the plurality of points distributed over the lens surface and the specified lens edge height with respect to the edge of the lens.

7. The method of claim 1, wherein the step of determining the lens height at a plurality of points comprises:

defining a mesh comprising a plurality of points over the surface of the lens;

determining mean power at each point on the mesh as defined by the specified mean power distribution over the lens surface; and numerically solving on the mesh a partial differential equation of the elliptic type, subject to the lens edge height as a boundary condition, to determine the lens height at each point of the mesh.

8. The method of claim 7, wherein the lens comprises a distance area and a reading area, and wherein the step of specifying mean power further comprises:

specifying mean power along a connecting path extending from a first point in the distance area to a second point in the reading area; and specifying mean power over a coordinate system widely distributed over the entire area of the lens consistently with the mean power specified along the connecting path.

9. The method of claim 8, wherein the coordinate system comprises a set of contour lines, each contour line intersecting the connecting path, and wherein specifying mean power over the coordinate system further comprises specifying mean power variation along the contour lines as a function, the mean power on a contour line and the mean power on the connecting path being equal at every point where a contour line intersects the connecting path.

10. The method of claim 9, further comprising rotating in a controlled manner the specified mean power values with respect to the plurality of points distributed over the lens surface and the specified lens edge height with respect to the edge of the lens.

11. The method of claim 1, wherein the lens comprises a distance area and a reading area, and wherein the step of specifying mean power further comprises:

specifying mean power along a connecting path extending from a first point in the distance area to a second point in the reading area; and specifying mean power over a coordinate system distributed over the surface of the lens consistently with the mean power specified along the connecting path.

12. The method of claim 11, wherein the step of specifying mean power over the coordinate system further comprises:

specifying mean power in the distance area and reading area; and specifying mean power over a coordinate system distributed over the remaining area of the lens consistently with the mean power specified along the connecting path.

13. The method of claim 11, wherein the coordinate system comprises a set of contour lines, each contour line intersecting the connecting path, and wherein specifying mean power over the coordinate system further comprises specifying mean power variation along the contour lines as a function, the mean power on a contour line and the mean power on the connecting path being equal at every point where a contour line intersects the connecting path.

14. The method of claim 13, wherein each contour line intersects the connecting path only once and each contour line does not intersect any other contour line.

15. The method of claim 14, wherein the mean power is constant along the length of each contour line.

16. The method of claim 14, wherein the mean power varies along the length of each contour line.

17. The method of claim 11, wherein specifying the lens height around the edge of the lens comprises defining a boundary height profile function in which
the boundary height varies only slightly in a first boundary segment adjacent to the distance area and a second boundary segment adjacent to the reading area, and
the boundary height undergoes substantially smooth transitions between the first and second boundary segments.

18. The method of claim 11, further comprising redistributing astigmatism away from the connecting path.

19. The method of claim 18, wherein the step of redistributing astigmatism comprises:
determining a change in mean power required to reduce astigmatism on the connecting path;
distributing the change in mean power across the lens to modify the specified mean power values;
determining lens height at the points of the plurality of points distributed over the lens surface using the modified mean power values at the points.

20. The method of claim 1, further comprising rotating in a controlled manner the specified mean power values with respect to the plurality of points distributed over the lens surface and the specified lens edge height with respect to the edge of the lens.

21. The method of claim 20, wherein the rotation is controlled by an angle-dependent handing function $H(\theta)$ such that $M(\rho,\theta) \rightarrow M(\rho,H(\theta))$ and $z(\theta) \rightarrow z(H(\theta))$ where M is mean power, $z(\theta)$ is the lens edge height, and $(\rho,\theta)$ are polar coordinates over the area of the lens.

22. A progressive lens comprising a surface having a variable height and including a distance area and a reading area, wherein mean power over the lens surface varies according to a set of curves forming iso-mean power contours on the lens surface and a contour defining an area of constant mean power in the distance area that is substantially elliptical, and wherein mean power M varies along a connecting path extending from a first point in the distance area to a second point in the reading area according to a function of the form:

$$M(y) = M_D + \left[\frac{M_R - M_D}{2}\right]\left[1 - \cos\left(\pi \frac{y_D - y}{y_D - y_R}\right)\right]$$

where $M_D$ is mean power specified at the a first point $(0,y_D)$ in the distance area and $M_R$ is mean power specified at the second point $(0,y_R)$ in the reading area.

23. The progressive lens of claim 22, where astigmatism along the connecting path is less than $0.15*(M_R-M_D)$ where $M_D$ is mean power specified at the first point in the distance area and $M_R$ is mean power specified at the second point in the reading area.

24. A system for manufacturing a progressive lens, the system comprising:
a processor for accepting inputs defining mean power variation over a coordinate system covering the surface of the lens and defining lens height around the edge of the lens and for calculating lens height at a plurality of points over the lens surface by solving an elliptic partial differential equation subject to the lens height at the edge of the lens as a boundary condition; and
a memory for storing the calculated lens height values.

25. The system of claim 24, further comprising a numerically controlled milling machine for accepting the calculated lens height values and using the calculated lens height values for machining the lens or a mold for producing the lens or a former for producing the lens.

26. The system of claim 25, wherein the numerically controlled milling machine adjusts the calculated lens height values in accordance with the type of machining tool fitted to the milling machine.

27. A system for manufacturing a progressive lens, the system comprising:
means for accepting inputs defining mean power variation over a coordinate system covering the surface of the lens and defining lens height around the edge of the lens and for calculating lens height at a plurality of points over the lens surface by solving an elliptic partial differential equation subject to the lens height at the edge of the lens as a boundary condition; and
means for storing the calculated lens height values.

28. The system of claim 27, further comprising means for accepting the calculated lens height values and using the calculated lens height values for machining the lens or a mold for producing the lens or a former for producing the lens.

29. A system for designing a progressive lens comprising a processor for calculating lens height at a plurality of points over the lens surface according to the method of claim 1.

30. A system for designing progressive lens, the system comprising:
a processor for accepting inputs defining mean power variation over a coordinate system covering the surface of the lens and defining lens height around the edge of the lens and for calculating lens height at a plurality of points over the lens surface by solving an elliptic partial differential equation subject to the lens height at the edge of the lens as a boundary condition; and
a memory for storing the calculated lens height values.

31. A system for designing a progressive lens comprising:
means for accepting inputs defining mean power variation over a coordinate system covering the surface of the lens and defining lens height around the edge of the lens and for calculating lens height at a plurality of points over the lens surface by solving an elliptic partial differential equation subject to the lens height at the edge of the lens as a boundary condition; and
means for storing the calculated lens height values.

32. A progressive lens comprising a surface having a variable height and including a distance area and a reading area, wherein mean power over the lens surface varies according to a set of curves forming iso-mean power contours on the lens surface and a contour defining an area of constant mean power in the distance area that is substantially elliptical, and where astigmatism along the connecting path is less than $0.15*$ $(M_R-M_D)$ where $M_D$ is mean power specified at a first point $(0,y_D)$ in the distance area and $M_R$ is mean power specified at a second point $(0,y_R)$ in the reading area.

* * * * *